(12) United States Patent
Imai et al.

(10) Patent No.: US 9,039,159 B2
(45) Date of Patent: May 26, 2015

(54) IMAGE RECORDING METHOD

(71) Applicant: Canon Kabushiki Kaisha, Tokyo (JP)

(72) Inventors: Takashi Imai, Kawasaki (JP); Mamiko Kaji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/450,122

(22) Filed: Aug. 1, 2014

(65) Prior Publication Data

US 2015/0035899 A1 Feb. 5, 2015

(30) Foreign Application Priority Data

Aug. 5, 2013 (JP) .................. 2013-162389

(51) Int. Cl.
| | | |
|---|---|---|
| *G01D 11/00* | (2006.01) | |
| *B41J 2/01* | (2006.01) | |
| *C09D 11/38* | (2014.01) | |
| *C09D 11/322* | (2014.01) | |

(52) U.S. Cl.
CPC . *B41J 2/01* (2013.01); *C09D 11/38* (2013.01); *C09D 11/322* (2013.01)

(58) Field of Classification Search
CPC ....... B41J 2/2114; C09D 11/40; C09D 11/30; C09D 11/322; C09D 11/54
USPC ............. 347/21, 95, 96, 100; 106/31.13, 31.6
See application file for complete search history.

(56) References Cited

U.S. PATENT DOCUMENTS

| | | | | |
|---|---|---|---|---|
| 7,445,666 | B2 * | 11/2008 | Yanagimachi et al. .... | 106/31.47 |
| 8,752,949 | B2 * | 6/2014 | Sasada et al. ................. | 347/100 |
| 2010/0236447 | A1 | 9/2010 | Sakai | |

FOREIGN PATENT DOCUMENTS

| | | |
|---|---|---|
| EP | 2295505 A1 | 3/2011 |
| EP | 2489707 A1 | 8/2012 |
| JP | 07-032721 A | 2/1995 |
| JP | 2010-031267 A | 2/2010 |
| JP | 2012-092317 A | 5/2012 |

* cited by examiner

*Primary Examiner* — An Do
(74) *Attorney, Agent, or Firm* — Canon U.S.A. Inc., IP Division

(57) ABSTRACT

An image recording method includes applying an ink containing a pigment in a dispersion to a region of a recording medium, and applying a liquid composition capable of destabilizing the dispersion of the pigment in the ink to the recording medium so as to cover at least part of the region of the recording medium. The ink further contains polymer particles, and at least one surfactant selected from the group consisting of the compounds expressed by General Formula (1) and the compounds expressed by General Formula (2). In the ink, the content of the polymer particles is 3% by mass or more and 20% by mass or less relative to the total mass of the ink, and the mass ratio of the polymer particles to the surfactant is 1 or more and 10 or less.

4 Claims, No Drawings

IMAGE RECORDING METHOD

BACKGROUND OF THE INVENTION

1. Field of the Invention

The present invention relates to an image recording method.

2. Description of the Related Art

For recording an image, two-liquid reaction systems have been studied which use an ink and a liquid composition containing a reaction agent capable of destabilizing the dispersion of the pigment in the ink. Image recording methods using a two-liquid reaction system have been studied (Japanese Patent Laid-Open Nos. 7-32721 and 2010-31267). Japanese Patent Laid-Open No. 7-32721 discloses an image recording method using an ink containing a pigment and cationic polymer particles and a liquid composition containing an anionic reaction agent and anionic polymer particles, and teaches that this method reduces blotting or bleeding. Japanese Patent Laid-Open No. 2010-31267 discloses an image recording method using an ink containing a pigment and particles of a polymer having a structure derived from methacrylic acid derivatives and a liquid composition containing an organic acid, and teaches this method suppresses image migration.

On the other hand, an image recording method (single-liquid reaction system) not using a liquid composition has been studied for recording high-density, high-quality images (Japanese Patent Laid-Open No. 2012-92317). This method takes advantage of the nature of the ink itself to react. Japanese Patent Laid-Open No. 2012-92317 discloses an image recording method using an ink containing a pigment, polymer particles, and a block copolymer having an ethylene oxide structure and a propylene oxide structure. This block copolymer gelates at a specific temperature (gelation temperature) or more. This patent document describes that the ink aggregates rapidly by being applied to a recording medium heated to the gelation temperature or more.

SUMMARY OF THE INVENTION

According, an embodiment of the present invention provides an image recording method which includes applying an ink containing a pigment in a dispersion to a region of a recording medium, and applying a liquid composition capable of destabilizing the dispersion of the pigment in the ink to the recording medium so as to cover at least part of the region of the recording medium. The ink further contains polymer particles, and at least one surfactant selected from the group consisting of the compounds expressed by General Formula (1) and the compounds expressed by General Formula (2). In the ink, the content of the polymer particles is 3% by mass or more and 20% by mass or less relative to the total mass of the ink, and the mass ratio of the polymer particles to the surfactant is 1 or more and to 10 or less.

General Formula (1)

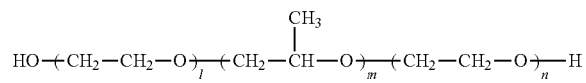

where l and n are numerals with "l+n" being 3 or more and 45 or less, and m represents a numeral of 16 or more and 57 or less.

General Formula (2)

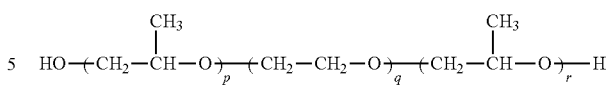

where p and r are numerals with "p+r" being 25 or more and 50 or less, and q represents a numeral of 8 or more and 25 or less.

Further features of the present invention will become apparent from the following description of exemplary embodiments with reference to the attached drawings.

DESCRIPTION OF THE EMBODIMENTS

In the studies of the present inventors, however, the image recording methods using the two-liquid reaction systems of the above-cited patent documents did not provide high-quality images when recording was performed at such a high speed as to meet recent demand. Also, in the above-cited single-liquid reaction system, the apparatus for this method tends to become large because the recording medium must be heated.

Accordingly, the present invention provides an image recording method using a two-liquid reaction system that can provide high-quality images without heating the recording medium.

The present invention will be further described using exemplary embodiments.

The present inventors examined why the known two-liquid reaction systems did not provide high-quality images when recording was performed at such a high speed as to meet recent demand. The results are as below.

Known image recording methods using a two-liquid reaction system are designed to increase the reactivity between the ink and the liquid composition and thus to prevent blotting or bleeding effectively. More specifically, the constituents and their contents of the ink and the liquid composition are controlled so that the pigment can aggregate rapidly when the ink and the liquid composition come into contact with each other. In a high-speed recording, the time interval between the applications of the ink and the liquid composition is very small, and accordingly, the ink and the liquid composition may be mixed in a state in which they are both liquid. The inventors found that if the reactivity between the ink and the liquid composition are excessively high, a phenomenon (image migration) occurs when they are mixed, in which the pigment aggregates to decrease in volume and the volume-decreased aggregate moves from the region where the ink and the liquid composition have been applied and is fixed to a region different from the desired region.

The present inventors have studied a method for reducing the phenomenon of image migration and reached the concept of the invention. More specifically, in an embodiment of the invention, the ink contains a pigment, polymer particles contains, and at least one surfactant selected from the groups consisting of the compounds expressed by General Formula (1) and the compounds expressed by General Formula (2) (hereinafter referred to as the surfactant of General Formula (1) or (2)), and the polymer particle content and the surfactant content have specific relationships: the polymer particle content is 3% by mass or more and 20% by mass or less relative to the total mass of the ink, and the mass ratio of the polymer particles to the surfactant is 1 or more and 10 or less.

General Formula (1)

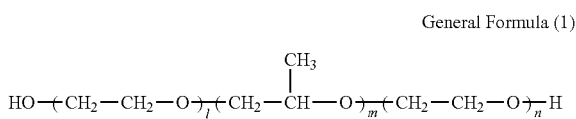

where l and n are numerals with "l+n" being 3 or more and 45 or less, and m represents a numeral of 16 or more and 57 or less.

General Formula (2)

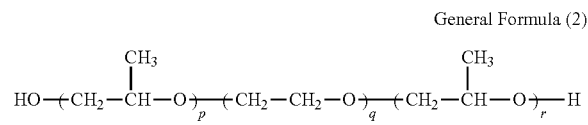

where p and r are numerals with "p+r" being 25 or more and 50 or less, and q represents a numeral of 8 or more and 25 or less.

In this embodiment, an advantageous effect that can solve the above issue is produced by the following mechanism.

Although the surfactants expressed by General Formula (1) or (2) have a hydrophilic ethylene oxide structure ($CH_2CH_2O$) and a less hydrophilic propylene oxide structure ($CH_2CH(CH_3)O$), thus acting as a surfactant, the function of these surfactants is weaker than typical surfactants. Therefore, when a surfactant of General Formula (1) or (2) is present with a pigment or polymer particles, the surfactant is likely to adsorb the surfaces of the pigment particles or polymer particles rather than is oriented to the gas-liquid interface. Accordingly, the pigment and the polymer particles in the ink are present in a loose aggregate with the surfactant of General formula (1) or (2) thereamong. This aggregation is promoted by mixing such an ink with the liquid composition, and aggregation reaction proceeds rapidly. At this time, the volume of the aggregate is unlikely to decrease because the surfactant is confined among the pigment and polymer particles. Probably, image migration is thus suppressed.

The studies of the present inventors teach that when the contents in the ink of the polymer and the surfactant of General Formula (1) or (2) have specific relationships, that is, when the polymer particle content is 3% by mass or more and 20% by mass or less relative with a mass ratio to the surfactant content of 1 or more and 10 or less, image migration can be suppressed effectively.

If the polymer particle content is less than 3% by mass or larger than 20% by mass, aggregation reaction becomes insufficient to form high-quality images.

If the mass ratio of the polymer particle content to the content of the surfactant of General Formula (1) or (2) is less than 1 (polymer particle content/surfactant content<1), the amount of the surfactant is relatively large to the polymer particles. The excessive surfactant hinders the aggregation reaction and high-quality image formation. If the mass ratio of the polymer particle content to the content of the surfactant of General Formula (1) or (2) is larger than 10 (polymer particle content/surfactant content>10), the amount of the surfactant is relatively small to the polymer particles, and accordingly, a sufficient amount of the surfactant cannot be confined among the polymer particles. Consequently, sufficient aggregation reaction does not occur, and high-quality image recording cannot be performed.

As in such a mechanism, the constituents and their contents of the ink and liquid composition interact synergetically with each other and thus produce an effect advantageous in solving the issue described above.

Image Recording Method

The image recording method according to an embodiment of the invention includes Step (A) of applying the ink to a region of a recording medium, and Step (B) of applying the liquid composition to the recording medium so as to cover at least part of the region to which the ink is applied.

In the present embodiment, the ink may be applied by an ink jet recording method that includes the step of discharging the ink from an ink jet recording head according to recording signals. In particular, an ink jet recording method is advantageous in which the ink is discharged through ejection openings of a recording head by thermal energy applied to the ink. The liquid composition is applied to the recording medium by, for example, an ink jet method or a coating method. Exemplary techniques for the coating method include roller coating, bar coating, and spray coating. The term "recording" mentioned herein includes the operation of recording on a recording medium such as glossy paper or plain paper, and the operation of printing on an impermeable recording medium such as a glass or plastic sheet or a plastic film.

In the present embodiment, Step (A) may be performed before Step (B), or Step (B) may be performed before Step (A). Also, if the same step is performed twice or more, the two steps may be performed, for example, in this order: Step (A), Step (B), and Step (A); or Step (B), Step (A) and Step (B). In particular, the operation of performing Step (A) after Step (B) is advantageous in enhancing image quality.

Set of Ink Jet Ink and Liquid Composition

The ink used in the present embodiment is not particularly limited, and may be a cyan ink, a magenta ink, a yellow ink, or a black ink. An image recording method of the present embodiment and a set of an ink and a liquid composition used in the image recording method will now be described. In the following description, "(meth)acrylic acid" refers to acrylic acid and methacrylic acid, and "(meth)acrylate" refers to acrylate and methacrylate.

Ink

The ink used in the image recording method of the present embodiment contains a pigment, polymer particles and at least one surfactant expressed by General Formula (1) or (2).

Surfactants Expressed by General Formula (1) or (2)

Surfactants expressed by General Formula (1) or (2) are block copolymers having an ethylene oxide structure and a propylene oxide structure.

General Formula (1)

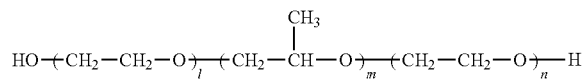

In General Formula (1), l and n are numerals with "l+n" being 3 or more and 45 or less, and m represents a numeral of 16 or more and 57 or less.

General Formula (2)

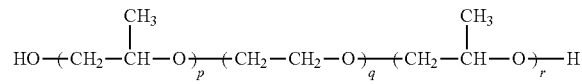

In General Formula (2), p and r are numerals with "p+r" being 25 or more and 50 or less, and q represents a numeral of 8 or more and 25 or less.

In the present embodiment, the surfactants expressed by General Formula (1) are more advantageous, and it is more advantageous that l+n is 3 or more and 15 or less and m is 16 or more and 31 or less.

Also, in the image recording method of the present embodiment, the surfactant content in the ink is preferably 0.2% by mass or more and 5% by mass or less, and more preferably 1% by mass or more and 4% by mass or less.

Resin Particles

The polymer particles mentioned herein refer to a polymer having particle sizes dispersed in a solvent. In the present embodiment, the particle size of the polymer particles is preferably 10 nm or more and 1,000 nm or less in terms of volume median particle size ($D_{50}$). Also, it is more preferably 40 nm or more and 500 nm or less. The median particle size $D_{50}$ of the polymer particles can be measured as below. The dispersion of the polymer particles is diluted to 50 times (on a volume basis) with pure water and subjected to measurement with UPA-EX150 (manufacture by Nikkiso) under the conditions: SetZero of 30 s; number of measurements of 3; measurement time of 180 s; and refractive index of 1.5.

Preferably, the polymer particles have a polystyrene-equivalent weight average molecular weight of 1,000 or more and 2,000,000 or less, measured by gel permeation chromatography (GPC).

The polymer particle content in the ink is 3% by mass or more and 20% by mass or less relative to the total mass of the ink. Preferably, the polymer particle content is 3% by mass or more and 15% by mass or less, and more preferably 5% by mass or more and 10% by mass or less.

Furthermore, in the ink, the mass ratio of the polymer particles to the surfactant is 1 or more and 10 or less (1≤polymer particle content/surfactant content≤10), as described above. Preferably, the mass ratio is 1.5 or more and 5.0 or less.

In addition, the mass ratio of the polymer particles to the pigment in the ink is preferably 0.2 or more and 100 or less.

Any polymer particles may be used in the ink of the present embodiment as long as under the above-mentioned condition. For producing the polymer particles, any monomers can be used, as long as capable of being polymerized by emulsion polymerization, suspension polymerization, dispersion polymerization, or the like. Exemplary polymer particles, different in monomer, include particles of acrylic polymer, vinyl acetate polymer, ester, ethylene, urethane polymer, synthetic rubber, vinyl chloride polymer, vinylidene chloride polymer, and olefin polymer. Among these, acrylic polymer particles and urethane polymer particles are advantageous.

The polymer particles may be an anionic polymer. Anionic polymer particles can react with a reaction agent in the liquid composition, described later, to facilitate the aggregation of the polymer particles.

For acrylic polymer particles, exemplary monomers include α,β-unsaturated carboxylic acids and salts thereof, such as (meth)acrylic acid, maleic acid, crotonic acid, angelic acid, itaconic acid, and fumaric acid; α,β-unsaturated carboxylic acid esters, such as ethyl (meth)acrylate, methyl (meth)acrylate, butyl (meth)acrylate, methoxyethyl (meth)acrylate, ethoxyethyl (meth)acrylate, diethylene glycol (meth)acrylate, triethylene glycol (meth)acrylate, tetraethylene glycol (meth)acrylate, polyethylene glycol (meth)acrylate, methoxydiethylene glycol (meth)acrylate, methoxytriethylene glycol (meth)acrylate, methoxytetraethylene glycol (meth)acrylate, methoxypolyethylene glycol (meth)acrylate, cyclohexyl (meth)acrylate, isobornyl (meth)acrylate, N,N-dimethylaminopropyl (meth)acrylate, monobutyl maleate, and dimethyl itaconate; α,β-unsaturated carboxylic acid alkylamides, such as (meth)acrylamide, dimethyl(meth)acrylamide, N,N-dimethylethyl(meth)acrylamide, N,N-dimethylpropyl(meth)acrylamide, isopropyl(meth)acrylamide, diethyl(meth)acrylamide, (meth)acryloyl morpholine, maleic acid monoamide, and crotonic acid methylamide; aryl group-containing α,β-ethylenic unsaturated compounds, such as styrene, α-methylstyrene, phenylvinyl acetate, benzyl (meth)acrylate, and 2-phenoxyethyl (meth)acrylate; and esters of polyfunctional alcohols, such as ethylene glycol diacrylate and polypropylene glycol dimethacrylate. The polymer particles may be made of a homopolymer produced by polymerizing one of these monomers, or a copolymer produced by polymerizing two or more of these monomers. If the polymer particles are made of a copolymer, the copolymer may be a random copolymer or a block copolymer. In particular, polymer particles made of a copolymer of a hydrophilic monomer and a hydrophobic monomer are advantageous. The hydrophilic monomer may be an α,β-unsaturated carboxylic acid or a salt thereof, and the hydrophobic monomer may be an α,β-unsaturated carboxylic acid ester or an α,β-ethylenic unsaturated compound having an aryl group.

Urethane polymer particles are produced by a reaction of a polyisocyanate compound, which has two or more isocyanate groups, and a polyol compound, which has two or more hydroxy groups. In the present embodiment, any of the urethane polymer particles produced by a reaction of a known polyisocyanate compound and a known polyol compound can be used as long as the particle size is within the above-mentioned range.

In structure, the polymer particles may have a single layer structure or a multilayer structure such as a core-shell structure. In the present embodiment, multilayer particles are advantageous. Resin particles having a core-shell structure are particularly advantageous. In polymer particles having a core-shell structure, the core portions and the shell portions have definitely different functions from each other. Resin particles having such a core-shell structure are advantageous in imparting more functions to the ink than polymer particles having a single-layer structure.

Pigment

In the present embodiment, any known pigments may be used as the pigment. The pigment content in the ink is preferably 0.2% by mass or more and 15.0% by mass or less, more preferably 0.6% by mass or more and 10.0% by mass or less, relative to the total mass of the ink.

The pigment may be of polymer-dispersed type that is dispersed with a polymer dispersant (polymer-dispersed pigment using a polymer dispersant, microencapsulated pigment including polymer particles whose surfaces are coated with a polymer, or polymer-bonded pigment including polymer particles having organic groups of a polymer chemically bonded to the surfaces thereof), or may be of self-dispersing type whose particles have hydrophilic groups at the surfaces thereof (self-dispersing pigment). Two or more pigments different in state of dispersion may be used in combination. Exemplary pigments include carbon black and organic pigments. The pigment may be composed of a single pigment or may contain two or more pigments. If the pigment is of polymer dispersed type, a polymer is used as a dispersant. The molecule of the polymer used as the dispersant desirably has a hydrophilic site and a hydrophobic site. Examples of such a polymer include acrylic polymer produced by polymerization using a monomer having a carboxy group, such as acrylic acid or methacrylic acid, and urethane polymer produced by polymerization using a diol having an anionic group, such as dimethylolpropionic acid.

The polymer used as a dispersant has an acid value, preferably, of 50 mg KOH/g or more and 550 mg KOH/g or less.

The polystyrene-equivalent weight average molecular weight (Mw), measured by gel permeation chromatography (GPC), of the polymer dispersant is preferably 1,000 or more and 50,000 or less.

The polymer dispersant content in the ink may be 0.1% by mass or more and 10.0% by mass or less, preferably 0.2% by mass or more and 4.0% by mass or less. The mass ratio of the polymer dispersant to the pigment is preferably 0.1 or more and 3.0 or less.

Aqueous Medium

The ink may contain water or an aqueous medium that is a mixture of water and a water-soluble organic solvent. If the ink contains an aqueous medium, the water-soluble organic solvent content is preferably 3.0% by mass or more and 50.0% by mass or less relative to the total mass of the ink. Any conventionally used water-soluble organic solvents can be used as the water-soluble organic solvent. Exemplary water-soluble organic solvents include alcohols, glycols, alkylene glycols containing an alkylene group having a carbon number of 2 to 6, polyethylene glycols, nitrogen-containing compounds, and sulfur-containing compounds. These water-soluble organic solvents may be used singly or in combination as required. If the ink contains water, the water is desirably deionized water (ion exchanged water). In this instance, the water content is preferably 50.0% by mass or more and 95.0% by mass or less relative to the total mass of the ink.

Other Constituents

The ink may further contain a water-soluble organic compound that is solid at room temperature, such as trimethylolpropane, trimethylolethane or any other polyhydric alcohol, or urea, ethyleneurea or any other urea derivative, if necessary. Furthermore, the link may optionally contain other additives, such as a surfactant other than the surfactants expressed by General Formula (1) or (2), a pH adjuster, a corrosion inhibitor, a preservative, an antifungal agent, an antioxidant, an antireductant, an evaporation promoter, a chelating agent, and a polymer other than the polymer particles.

Liquid Composition

The liquid composition is desirably colorless, milky-white or white so as not to affect images recorded with the ink. Accordingly, the absorbance of the liquid composition for wavelengths of visible light of 400 nm or more and 800 nm or less is desirably such that the ratio of the highest absorbance to the lowest absorbance (highest absorbance/lowest absorbance) is 1.0 or more and 2.0 or less. This suggests that the absorbance spectrum of the liquid composition has substantially no peak in the visible region. Even if a peak is exhibited, the intensity of the peak is very low. In addition, the liquid composition desirably does not contain a coloring material. The absorbance of the liquid composition can be obtained by measuring the liquid composition as it is using Hitachi Double Beam Spectrophotometer U-2900 (manufactured by Hitachi High-Technologies). For measuring the absorbance, the liquid composition may be diluted. The highest absorbance and the lowest absorbance are both proportional to dilution rate, and the ratio of the highest absorbance to the lowest absorbance is independent of the dilution rate.

Reaction Agent

The liquid composition used in the present embodiment may contain a reaction agent that will destabilize the dispersion of the pigment in the ink. The reaction agent may be selected from known materials and is, advantageously, at least one material selected from the group consisting of organic acids and polyvalent metal ions. A plurality of compounds may be used as the reaction agent.

Examples of the polyvalent metal ions include divalent metal ions, such as $Ca^{2+}$, $Cu^{2+}$, $Ni^{2+}$, $Mg^{2+}$, $Sr^{2+}$, $Ba^{2+}$, and $Zn^{2+}$; and trivalent metal ions, such as $Fe^{3+}$, $Cr^{3+}$, $Y^{3+}$, and $Al^{3+}$. Polyvalent metal ions can be added in a hydroxide form or a chloride salt form to the liquid composition, and may be produced by dissociation. The polyvalent ion content is preferably 3% by mass or more and 90% by mass or less relative to the total mass of the liquid composition.

Examples of the organic acids include oxalic acid, polyacrylic acid, formic acid, acetic acid, propionic acid, glycolic acid, malonic acid, malic acid, maleic acid, ascorbic acid, levulinic acid, succinic acid, glutaric acid, glutamic acid, fumaric acid, citric acid, tartaric acid, lactic acid, pyrrolidonecarboxylic acid, pyronecarboxylic acid, pyrrolecarboxylic acid, furancarboxylic acid, pyridinecarboxylic acid, coumalic acid, thiophenecarboxylic acid, nicotinic acid, oxysuccinic acid, and dioxysuccinic acid. The organic acid content is preferably 3% by mass or more and 99% by mass or less relative to the total mass of the liquid composition.

Aqueous Medium

The liquid composition of the present embodiment may contain water or an aqueous medium that is a mixture of water and a water-soluble organic solvent. If the liquid composition contains a water-soluble organic solvent, the water-soluble organic solvent content is preferably 3.0% by mass or more and 50.0% by mass or less relative to the total mass of the liquid composition. Any conventionally used water-soluble organic solvents can be used as the water-soluble organic solvent. Exemplary water-soluble organic solvents include alcohols, glycols, alkylene glycols containing an alkylene group having a carbon number of 2 to 6, polyethylene glycols, nitrogen-containing compounds, and sulfur-containing compounds. These water-soluble organic solvents may be used singly or in combination as required. If the liquid composition contains water, the water is desirably deionized water (ion exchanged water). In this instance, the water content is preferably 50.0% by mass or more and 95.0% by mass or less relative to the total mass of the liquid composition.

Other Constituents

The liquid composition may further contain a water-soluble organic compound that is solid at room temperature, such as trimethylolpropane, trimethylolethane or any other polyhydric alcohol, or urea, ethyleneurea or any other urea derivative, if necessary. Furthermore, the liquid composition may optionally contain other additives, such as a surfactant, a pH adjuster, a corrosion inhibitor, a preservative, an antifungal agent, an antioxidant, an antireductant, an evaporation promoter, a chelating agent, and a polymer.

EXAMPLES

The invention will be further described in detail with reference to Examples and Comparative Examples. However, the invention is not limited to the following Examples. In the following Examples, "part(s)" is on a mass basis unless otherwise specified.

Preparation of Inks
Preparation of Pigment Dispersions
Preparation of Black Pigment Dispersion A batch type vertical sand mill (manufactured by Aimex) was charged with a mixture of 10 parts of carbon black (product name: Monarch 1100, produced by Cabot), 15 parts of a polymer solution (containing 20.0% by mass of styrene-ethyl acrylate-acrylic acid copolymer (acid value: 150, weight average molecular weight: 8,000) in water, neutralized with an aqueous solution of potassium hydroxide), and 75 parts of pure water, and the materials were dispersed in each other with 200 parts of zirconia beads of 0.3 mm in diameter for 5 hours while being cooled with water. The resulting dispersion liquid was centrifuged to remove coarse particles, and thus a black pigment dispersion containing 10.0% by mass of pigment was prepared.

Preparation of Cyan Pigment Dispersion

A cyan pigment dispersion containing 10.0% by mass of a pigment was prepared in the same manner as in the preparation of the black pigment dispersion, except that C. I. Pigment Blue 15:3 was used as the pigment instead of carbon black.

Preparation of Magenta Pigment Dispersion

A magenta pigment dispersion containing 10.0% by mass of a pigment was prepared in the same manner as in the preparation of black pigment dispersion, except that C. I. Pigment Red 122 was used as the pigment instead of carbon black.

Preparation of Resin Particle Dispersion

The mixture of 18 parts of ethyl methacrylate, 2 parts of 2,2'-azobis-(2-methylbutyronitrile), and 2 parts of n-hexadecane was stirred for 0.5 hour. The mixture was dropped to 78 parts of 6% aqueous solution of styrene-butyl acrylate-acrylic acid copolymer (acid value: 130 mg KOH/g, weight average molecular weight: 7,000), followed by stirring for 0.5 hour. Then, the resulting mixture was subjected to supersonic wave irradiation for 3 hours. Subsequently, the mixture was subjected to a polymerization reaction for 4 hours in a nitrogen atmosphere at 80° C., followed by cooling at room temperature. The reaction product was filtered to yield a polymer particle dispersion with a polymer content of 40.0% by mass. The polymer particles in the dispersion had a weight average molecular weight of 250,000, and an average particle size ($D_{50}$) of 200 nm.

Preparation of Surfactants

Surfactants shown in Tables 1 and 2 were used. In the column of product name in the Tables, Pluronics are products of Adeka. Also, Newpol PE-78 is a surfactant produced by Sanyokasei.

TABLE 1

Surfactants Expressed by General Formula (1)

$$HO\text{---}(CH_2\text{---}CH_2\text{---}O)_l(CH_2\text{---}\underset{\underset{CH_3}{|}}{CH}\text{---}O)_m(CH_2\text{---}CH_2\text{---}O)_n\text{---}H$$

General Formula (1)

| Surfactant No. | Product name | Ethylene oxide structure l + n | Propylene oxide structure m |
|---|---|---|---|
| Surfactant 1-1 | Pluronic L31 | 3.0 | 16.4 |
| Surfactant 1-2 | Pluronic L34 | 14.0 | 16.4 |
| Surfactant 1-3 | Pluronic L61 | 5.3 | 30.2 |
| Surfactant 1-4 | Pluronic P84 | 43.9 | 38.8 |
| Surfactant 1-5 | Pluronic P103 | 37.1 | 56.0 |
| Surfactant 1-6 | Pluronic L101 | 12.1 | 56.0 |
| Surfactant 1-7 | Pluronic P85 | 53.0 | 38.8 |
| Surfactant 1-8 | Pluronic P123 | 40.5 | 66.4 |
| Surfactant 1-9 | Pluronic L23 | 6.0 | 12.4 |
| Surfactant 1-10 | Newpol PE-78 | 150.0 | 35.0 |

TABLE 2

Surfactants Expressed by General Formula (2)

$$HO\text{---}(CH_2\text{---}\underset{\underset{CH_3}{|}}{CH}\text{---}O)_p(CH_2\text{---}CH_2\text{---}O)_q(CH_2\text{---}\underset{\underset{CH_3}{|}}{CH}\text{---}O)_r\text{---}H$$

General Formula (2)

| Surfactant No. | Product name | Ethylene oxide structure q | Propylene oxide structure p + r |
|---|---|---|---|
| Surfactant 2-1 | Pluronic 25R-2 | 16.6 | 47.4 |
| Surfactant 2-2 | Pluronic 17R-2 | 16.6 | 30.2 |

Preparation of Inks
Preparation of Black Inks

The above-prepared polymer particle dispersion and pigment dispersion were mixed with the following materials. The "balance" of ion exchanged water is an amount in which the sum of the constituents of the ink becomes 100.0% by mass.

Black pigment dispersion (pigment content: 10.0% by mass): 20.0% by mass
Polymer particle dispersion (polymer content: 40.0% by mass): X (% by mass) in Table 3
Surfactant (see Table 3): Y (% by mass) in Table 3
Glycerin: 5.0% by mass
Polyethylene glycol (number average molecular weight: 1,000): 3.0% by mass
1,6-Hexanediol: 5.0% by mass
Acetylenol E 100 (surfactant, produced by Kawaken Fine Chemical): 0.1% by mass
Ion-exchanged water: balance These materials were sufficiently dispersed in each other, and the resulting mixture was subjected to pressure filtration through a microfilter having a pore size of 3.0 μm (manufactured by Fujifilm). Thus Black Inks 1 to 28 were prepared.

TABLE 3

Black Ink Preparation Conditions

| Black ink No. | Polymer particle dispersion | | | | Polymer particle (solid) content/ surfactant content |
|---|---|---|---|---|---|
| | Content X | Polymer Particle solid content | Surfactant expressed by General Formula (1) or (2) Type | Content Y | |
| Black ink 1 | 25.0 | 10.0 | Surfactant 1-1 | 3.0 | 3.3 |
| Black ink 2 | 25.0 | 10.0 | Surfactant 1-2 | 3.0 | 3.3 |
| Black ink 3 | 25.0 | 10.0 | Surfactant 1-3 | 3.0 | 3.3 |
| Black ink 4 | 25.0 | 10.0 | Surfactant 1-4 | 3.0 | 3.3 |
| Black ink 5 | 25.0 | 10.0 | Surfactant 1-5 | 3.0 | 3.3 |
| Black ink 6 | 25.0 | 10.0 | Surfactant 1-6 | 3.0 | 3.3 |
| Black ink 7 | 25.0 | 10.0 | Surfactant 2-1 | 3.0 | 3.3 |
| Black ink 8 | 25.0 | 10.0 | Surfactant 2-2 | 3.0 | 3.3 |
| Black ink 9 | 7.5 | 3.0 | Surfactant 1-1 | 3.0 | 1.0 |
| Black ink 10 | 37.0 | 19.8 | Surfactant 1-1 | 3.0 | 6.6 |
| Black ink 11 | 12.5 | 5.0 | Surfactant 1-1 | 5.0 | 1.0 |
| Black ink 12 | 25.0 | 10.0 | Surfactant 1-1 | 1.0 | 10.0 |
| Black ink 13 | 12.5 | 5.0 | Surfactant 1-1 | 3.0 | 1.7 |
| Black ink 14 | 12.5 | 5.0 | Surfactant 1-1 | 1.0 | 5.0 |
| Black ink 15 | 25.0 | 10.0 | Surfactant 1-1 | 5.0 | 2.0 |
| Black ink 16 | 25.0 | 10.0 | Surfactant 1-1 | 6.0 | 1.7 |
| Black ink 17 | 25.0 | 10.0 | Surfactant 1-7 | 3.0 | 3.3 |
| Black ink 18 | 25.0 | 10.0 | Surfactant 1-8 | 3.0 | 3.3 |
| Black ink 19 | 25.0 | 10.0 | Surfactant 1-9 | 3.0 | 3.3 |
| Black ink 20 | 25.0 | 10.0 | Surfactant 1-10 | 3.0 | 3.3 |
| Black ink 21 | 0 | 0 | Surfactant 1-1 | 2.0 | — |
| Black ink 22 | 5.0 | 2.0 | Surfactant 1-1 | 2.0 | 1.0 |
| Black ink 23 | 50.0 | 25.0 | Surfactant 1-1 | 3.0 | 8.3 |
| Black ink 24 | 2.0 | 0.8 | Surfactant 1-1 | 0.1 | 8.0 |
| Black ink 25 | 4.0 | 1.6 | Surfactant 1-1 | 0.2 | 8.0 |
| Black ink 26 | 25.0 | 10.0 | — | 0 | — |
| Black ink 27 | 7.5 | 3.0 | Surfactant 1-1 | 4.0 | 0.8 |
| Black ink 28 | 30.0 | 12.0 | Surfactant 1-1 | 1.0 | 12.0 |

Preparation of Cyan Inks and Magenta Inks

Cyan Inks 1 to 28 and Magenta Inks 1 to 28 were prepared in the same manner as the Black Inks described above, except that the cyan pigment dispersion or the magenta pigment dispersion was used instead of the black pigment dispersion.

Preparation of Liquid Compositions
Preparation of Liquid Composition 1

The following materials were mixed, and the mixture was sufficiently stirred to disperse the materials in each other.

Glutaric acid: 30.0% by mass
Glycerin: 5.0% by mass
Potassium hydroxide (neutralizer): 5.0% by mass
Acetylenol E 100 (surfactant, produced by Kawaken Fine Chemical): 1.0% by mass
Ion-exchanged water: 59.0% by mass Then, the resulting mixture was subjected to pressure filtration through a microfilter having a pore size of 3.0 μm (manufactured by Fujifilm) to yield liquid composition 1.

Preparation of Liquid Composition 2

The following materials were mixed, and the mixture was sufficiently stirred to disperse the materials in each other.

Calcium nitrate tetrahydrate: 30.0% by mass
Glycerin: 5.0% by mass
Acetylenol E 100 (surfactant, produced by Kawaken Fine Chemical): 1.0% by mass
Ion-exchanged water: 64.0% by mass Then, the resulting mixture was subjected to pressure filtration through a microfilter having a pore size of 3.0 μm (manufactured by Fujifilm) to yield liquid composition 2.

Evaluation of Images

The ink cartridges charged with the inks prepared above were amounted on an image recording apparatus. In the image recording apparatus used for the evaluation, the recording duty of 100% was a condition where one droplet of 3.0 ng of ink is applied to a unit region of $\frac{1}{1,200}$ inch×$\frac{1}{1,200}$ inch at a resolution of 1,200 dpi×1,200 dpi. Images were recorded in a manner described below, and the quality of the images was evaluated by examining the variation in dot size and the occurrence of image migration. Examination processes and Evaluation criteria were as follows: When either the variation in dot size (diameter) or the occurrence of image migration was rated as C or D, the image quality was judged to be low and unacceptable. The results are shown in Table 4.

Variation in Dot Size

First, each liquid composition was applied to a recording medium (Pearl Coat, manufactured by Mitsubishi Paper Mills) with a coating roller at an application rate of 1.0 g/m$^2$, using the above-described image recording apparatus. Then, a cyan ink was discharged onto the resulting recording medium from an ink jet recording head, thus recording an image (5 cm×5 cm solid pattern) with a recording duty of 100%. Furthermore, a black ink was applied to the region where the solid pattern of the cyan ink was recorded and a region of the recording medium where the solid pattern was not recorded. The dot size (diameter) $d_1$ of the black ink in the region of the cyan solid pattern and the dot size (diameter) $d_2$ of the black ink in the region where the cyan solid patter was not printed were measured, and the dot size ratio (=100×|$d_1$−$d_2$|/$d_1$) was calculated. The results were rated according to the following criteria:

AA: Dot size ratio was less than 5.
A: Dot size ratio was 5 or more and less than 10.
B: Dot size ratio was 10 or more and less than 20.
C: Dot size ratio was 20 or more.

Occurrence of Image Migration

First, each liquid composition was applied to a recording medium (Pearl Coat, manufactured by Mitsubishi Paper Mills) with a coating roller at an application rate of 1.0 g/m$^2$, using the above-described image recording apparatus. Then, a black ink, a cyan ink and a magenta ink were discharged onto the recording medium having the coating of the liquid composition from an ink jet recording head, thus recording an image (5 cm×5 cm solid pattern) with a recording duty of 300% (100% for each ink). The resulting image was checked for missing color through a microscope. If image migration occurs, a missing color is observed in the solid pattern. The rating criteria were as follows:

A: No missing color was observed.
B: Missing color was observed, but was at an acceptable level.
C: Marked missing color was observed.

This application claims the benefit of Japanese Patent Application No. 2013-162389, filed Aug. 5, 2013, which is hereby incorporated by reference herein in its entirety.

TABLE 4

Evaluation of Ink-Liquid Composition Combinations

| Example No. | Black ink No. | Cyan ink No. | Magenta ink No. | Liquid composition No. | Evaluation Dot size Variation | Evaluation Image migration |
|---|---|---|---|---|---|---|
| Example 1 | Black ink 1 | Cyan ink 1 | Magenta ink 1 | Liquid composition 1 | AA | A |
| Example 2 | Black ink 2 | Cyan ink 2 | Magenta ink 2 | Liquid composition 1 | AA | A |
| Example 3 | Black ink 3 | Cyan ink 3 | Magenta ink 3 | Liquid composition 1 | AA | A |
| Example 4 | Black ink 4 | Cyan ink 4 | Magenta ink 4 | Liquid composition 1 | A | A |
| Example 5 | Black ink 5 | Cyan ink 5 | Magenta ink 5 | Liquid composition 1 | A | A |
| Example 6 | Black ink 6 | Cyan ink 6 | Magenta ink 6 | Liquid composition 1 | A | A |
| Example 7 | Black ink 7 | Cyan ink 7 | Magenta ink 7 | Liquid composition 1 | AA | B |
| Example 8 | Black ink 8 | Cyan ink 8 | Magenta ink 8 | Liquid composition 1 | AA | B |
| Example 9 | Black ink 9 | Cyan ink 9 | Magenta ink 9 | Liquid composition 1 | A | A |
| Example 10 | Black ink 10 | Cyan ink 10 | Magenta ink 10 | Liquid composition 1 | A | A |
| Example 11 | Black ink 11 | Cyan ink 11 | Magenta ink 11 | Liquid composition 1 | A | A |
| Example 12 | Black ink 12 | Cyan ink 12 | Magenta ink 12 | Liquid composition 1 | A | A |
| Example 13 | Black ink 13 | Cyan ink 13 | Magenta ink 13 | Liquid composition 1 | AA | A |
| Example 14 | Black ink 14 | Cyan ink 14 | Magenta ink 14 | Liquid composition 1 | AA | A |
| Example 15 | Black ink 15 | Cyan ink 15 | Magenta ink 15 | Liquid composition 1 | AA | A |
| Example 16 | Black ink 16 | Cyan ink 16 | Magenta ink 16 | Liquid composition 1 | A | A |
| Example 17 | Black ink 1 | Cyan ink 1 | Magenta ink 1 | Liquid composition 2 | A | B |
| Comparative Example 1 | Black ink 17 | Cyan ink 17 | Magenta ink 17 | Liquid composition 1 | C | B |
| Comparative Example 2 | Black ink 18 | Cyan ink 18 | Magenta ink 18 | Liquid composition 1 | C | B |
| Comparative Example 3 | Black ink 19 | Cyan ink 19 | Magenta ink 19 | Liquid composition 1 | A | C |
| Comparative Example 4 | Black ink 20 | Cyan ink 20 | Magenta ink 20 | Liquid composition 1 | C | B |
| Comparative Example 5 | Black ink 21 | Cyan ink 21 | Magenta ink 21 | Liquid composition 1 | C | C |
| Comparative Example 6 | Black ink 22 | Cyan ink 22 | Magenta ink 22 | Liquid composition 1 | C | B |
| Comparative Example 7 | Black ink 23 | Cyan ink 23 | Magenta ink 23 | Liquid composition 1 | C | B |
| Comparative Example 8 | Black ink 24 | Cyan ink 24 | Magenta ink 24 | Liquid composition 1 | C | C |
| Comparative Example 9 | Black ink 25 | Cyan ink 25 | Magenta ink 25 | Liquid composition 1 | C | C |
| Comparative Example 10 | Black ink 26 | Cyan ink 26 | Magenta ink 26 | Liquid composition 1 | C | B |
| Comparative Example 11 | Black ink 27 | Cyan ink 27 | Magenta ink 27 | Liquid composition 1 | C | B |
| Comparative Example 12 | Black ink 28 | Cyan ink 28 | Magenta ink 28 | Liquid composition 1 | C | B |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image recording method comprising:
   applying an ink comprising a pigment to a region of a recording medium, and applying a liquid composition capable of destabilizing the dispersion of the pigment to the recording medium so as to cover at least part of the region of the recording medium;

wherein the ink comprises a polymer particle and at least one surfactant selected from the group consisting of the compounds expressed by General Formula (1) and the compounds expressed by General Formula (2), wherein a content of the polymer particle is 3% by mass or more and 20% by mass or less relative to the total mass of the ink, and wherein the mass ratio of the content of the polymer particle to the content of the surfactant in the ink is 1 or more and 10 or less, General Formula (1)

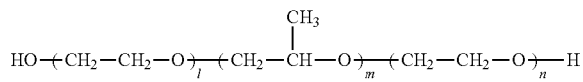

wherein "l+n" is 3 or more and 45 or less, and m is 16 or more and 57 or less, and General Formula (2)

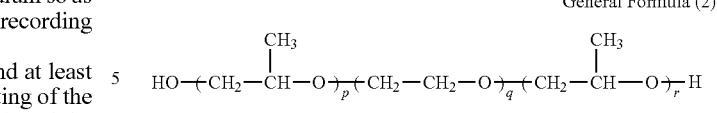

wherein "p+r" is 25 or more and 50 or less, and q is 8 or more and 25 or less.

2. The image recording method according to claim 1, wherein the content of the surfactant in the ink is 0.2% by mass or more and 5% by mass or less relative to the total mass of the ink.

3. The image recording method according to claim 1, wherein the mass ratio of the content of the polymer particle to the content of the surfactant in the ink is 1.5 or more and 5.0 or less.

4. The image recording method according to claim 1, wherein the polymer particle in the ink is an anionic polymer particle.

* * * * *